United States Patent [19]

Bliss

[11] 4,133,503
[45] * Jan. 9, 1979

[54] ENTRY, DISPLAY AND USE OF DATA EMPLOYED TO OVERCOME AIRCRAFT CONTROL PROBLEMS DUE TO WIND SHEAR

[76] Inventor: John H. Bliss, 2740 Graysby Ave., San Pedro, Calif. 90732

[*] Notice: The portion of the term of this patent subsequent to May 3, 1994, has been disclaimed.

[21] Appl. No.: 751,801

[22] Filed: Dec. 17, 1976

Related U.S. Application Data

[63] Continuation-in-part of Ser. No. 669,273, Mar. 22, 1976, which is a continuation-in-part of Ser. No. 608,408, Aug. 29, 1975, Pat. No. 4,021,010.

[51] Int. Cl.² .......................... G05D 1/12; G05D 1/08
[52] U.S. Cl. .................... 244/188; 73/178 T; 244/182; 340/27 SS; 364/431
[58] Field of Search .......................... 73/178 R, 178 T; 235/150.2, 150.22, 150.26, 150.27; 244/182, 183, 186–188; 318/583; 340/27 R, 27 SS; 343/8, 112 S; 364/430, 431, 440

[56] References Cited

U.S. PATENT DOCUMENTS

| | | | |
|---|---|---|---|
| 2,134,716 | 11/1938 | Gunn | 343/8 X |
| 2,178,237 | 10/1939 | Linder | 343/8X |
| 2,218,907 | 10/1940 | Donnelly et al. | 343/112 S |
| 2,766,953 | 10/1956 | Cummings | 244/182 X |
| 3,028,592 | 4/1962 | Parr et al. | 343/8 |
| 3,131,390 | 4/1964 | Condie et al. | 343/8 |
| 3,381,656 | 5/1968 | Ohnikian et al. | 73/178 X |
| 3,757,094 | 9/1973 | Schmitt | 235/150.2 |
| 3,868,497 | 2/1975 | Vietor | 235/150.2 X |
| 3,924,111 | 2/1975 | Farris | 235/150.26 X |
| 4,021,010 | 5/1977 | Bliss | 340/27 SS X |

Primary Examiner—Stephen G. Kunin
Attorney, Agent, or Firm—William W. Haefliger

[57] ABSTRACT

A system of airplane instrumentation utilizing devices and procedures for dealing with wind shear on the final approach to a landing. The system is designed for use in a like manner on all approaches for landing to assure that a safe, stable speed be used during all landing approaches, and that the Pilot be apprised of the conditions his airplane is flying through at all times during the approach. The primary aim is to provide instrumentation which will aid the Pilot in achieving safe approach criteria, give him information on which to base his judgment, and eliminate accidents on the final approach due to wind shear.

33 Claims, 11 Drawing Figures

ENTRY, DISPLAY AND USE OF DATA EMPLOYED TO OVERCOME AIRCRAFT CONTROL PROBLEMS DUE TO WIND SHEAR

BACKGROUND OF THE INVENTION

This application is a continuation-in-part of my earlier application Ser. No. 669,273 filed Mar. 22, 1976, which was a continuation-in-part of earlier application Ser. No. 608,408, filed Aug. 29, 1975, said Ser. No. 608,408 now being U.S. Pat. No. 4,021,010.

This invention relates generally to aircraft flight control, and more particularly concerns method and apparatus to aid in overcoming problems of aircraft control that arise due to the existence of wind shear.

Since there is no instrumentation in use designed to deal with the problem to be described, and very little general knowledge of the subject of wind shear, it may be appropriate to define the problem in simple familiar terms.

Early in training, a Pilot must program his thinking in such a fashion so as to accept the fact that he does not have to hold constant rudder or aileron while enroute in a crosswind. He has to accept the fact that once an airplane is flying, the ground has nothing to do with its flight characteristics. This fact is proven to him on every flight he makes, and it becomes an inviolate law in his mind.

As with many laws concerning physical, natural events, there are sometimes new and more accurate means of measurement introduced, which show that there may be flaws in the accepted laws. When this happens, minds must be reprogrammed to accommodate these changes.

It is easily accepted that wind is merely the movement of an air mass relative to the ground, and just as easily accepted that there is a precise quantitative relationship between airspeed, wind component, and groundspeed. The experienced Pilot deals with these quantities routinely in flight-planning, but on a macroscopic scale.

If one should mount an airspeed indicator on his car, he should clearly understood many of the relationships which follow:

It is obvious that an airspeed indicator mounted on a car would show these same relationships between airspeed, wind component, and groundspeed. Until some thought is given to it, there may be some facts, not so obvious, when dealing with relationships on this scale. For example, you are the driver, and you are directed to drive the car at a constant airspeed of 70 MPH. You are driving down a long straight road with a 20 MPH headwind component, so the speedometer (groundspeed) is steady on 50 MPH.

Due to some turbulence introduced into the moving air by brush, small trees, etc. adjacent to the road, there is an area where the airspeed fluctuates plus or minus 10 miles per hour, and you are aware of your airspeed fluctuation between 60 and 80 MPH. It is obvious to you the actual amount of the deviation of the wind component, and precisely when it occurs. You drive on and encounter two large buildings, one on each side of the road. Due to the venturi-effect of the wind between these buildings, the local wind between them increases to 30 MPH, and you must decelerate to 40 MPH on the speedometer in order to bring your airspeed from 80 back to 70 MPH. Due to the mass of the car, you find it necessary to accept the excess airspeed until the car slows the 10 MPH necessary, yielding 70 MPH airspeed and 40 MPH speedometer reading. Immediately after the buildings you enter a tunnel where the wind is calm. At this point your indicated airspeed will drop to equal the speedometer reading of 40 MPH. You, the driver, can accelerate your groundspeed to 70 MPH and obtain an indicated airspeed (IAS) of 70 again by pushing on the accelerator, but during the time it takes to accelerate, you will have to accept the lower IAS. The presentation of these elementary facts is offered in an attempt to give examples within a more understandable framework than usual so as to remove the mysteries of wind shear and promote understanding.

Though the importance of airspeed in an airplane cannot be overstated, there are instances where a more comprehensive dimension of understanding is necessary. The Pilot is the one who must understand and deal with the following facts:

When an airplane is flying through air in which a wind shear exists, it may encounter wind component changes which change its airspeed and flight characteristics. When the Pilot changes the power setting to compensate, he is merely changing his groundspeed, and his IAS change is only a secondary result, in the same manner as if he were driving a car with an airspeed indicator.

He can only change IAS within the limits of the inertial acceleration or deceleration which he can bring about in groundspeed. If, along its flightpath, an airplane should encounter a diminishing headwind component which changes at 3 Kts. per second, and the airplane is capable of accelerating groundspeed with full power at 2.5 Kts. per second, when with full power there will be ½ knot loss in IAS each second all during the duration of wind change. There are on record changes far exceeding the possible acceleration available for jet transport airplanes.

The utilization of indicated airspeed as the sole criteria of speed control on the approach of aircraft is as hopeless as it would be on an automobile during wind shear conditions.

SUMMARY OF THE INVENTION

It is the major object of this invention to provide a method and simple apparatus by which a Pilot can control the speed of an airplane on the landing approach, such speed designed to eliminate, as much as possible, the wind shear hazard.

It is a general object of this invention to integrate a groundspeed quantity into the normal approach criteria in such a manner so as to counter wind shear hazards which may be present during an airplane' final approach to a landing. This requires a groundspeed (GS) measurement of more accuracy than is presently available in most navigational systems. At present, Inertial Navigational Systems (INS) and possibly some Doppler radar systems offer the only means of good quality groundspeed usable in this system.

An object of this invention is to disclose means for obtaining groundspeed for use in this system. The use of this system is not intended to be restricted to groundspeed as obtained only by the means described, as any means of obtaining good quality groundspeed, accurate as of the past few seconds, may be used.

It is another object of this invention to utilize information from systems commonly in use and installed on aircraft as much as possible for its operation with the least additional apparatus.

It is a further object of this invention to give the Pilot information continuously all during the approach as regards wind component difference between his present position and the landing area, so that he will more logically make decisions whether to continue the approach.

It is another object of this invention to disclose a system in which all of the subject parameters are met and which introduces as little increased workload on the Pilot as possibly, namely, one in which the Pilot merely injects the surface wind direction and velocity into a computer.

It is another object of this invention to give the Pilot an additional final control over the amount of surface wind applied to the groundspeed target index setting, so that late during the approach, if a new wind is reported by the control tower, he can change the amount of pre-planned surface wind component applied when there may not be enough time to reprogram the direction and velocity figures installed in the computer.

It is another object of this invention to provide apparatus which can be made appropriately for a wide range of aircraft types, from light aircraft to transport types, particularly those suited to instrument flight operations.

These and other objects and advantages of the invention, as well as the details of an illustrative embodiment, will be more fully understood from the following description and drawings, in which:

DETAILED DESCRIPTION

The use of this type system requires that normal approach indicated airspeed or a predetermined approach groundspeed be used as the approach speed criteria, whichever is the least, compared to its own predetermined target index value. Of these two values, one or the other at any given time is the commanding function fed to a fast/slow indicator and to any auto-throttle device on the approach, along with a "caution tailwind" warning device to warn the pilot whenever the groundspeed exceeds the airspeed by a pre-programmed amount, determined by aircraft radar altimeter altitude. If this warning activates, he should consider cancelling the approach and choose an approach from a different direction, determined by surface wind and his drift at the time of approach cancellation. This condition is caused by a tailwind component at that altitude, the value of which the pilot can deduce from the amount the groundspeed (GS) exceeds the zero wind marker.

Reference is here made to my U.S. Pat. No. 4,021,010, and particularly FIGS. 1–4 of same, as respects background disclosure. In that patent, the use of a sensor 27 is described, as providing actual groundspeed signals at 26. Sensor 27 may comprise an INS, or may be part of a Doppler radar device.

Along with this description is added a method of obtaining usable groundspeed by employing an airborn Doppler radar along with a ground based transponder-like device. If an airplane has a Doppler radar transmitting in a fan shaped beam ahead, and there exists a transponder-like device near the intersection of an airport's runways, then the groundspeed recorded will be relative to any runway used and will be accurate when inbound regardless of heading.

The following described method and instrumentation greatly simplifies the Pilot's or other flight officer's tasks required in achieving the above described objectives. The purpose of this device is to simplify the process of calculation of TAS and wind component for use in that system. It can be used to automatically program these values into the system, provide the means of integrating the described system into an existing approach instrumentation by adding components to achieve all the parameters previously described, and use the normally presently installed instruments as much as possible.

Figures 1, 1A, 1B:
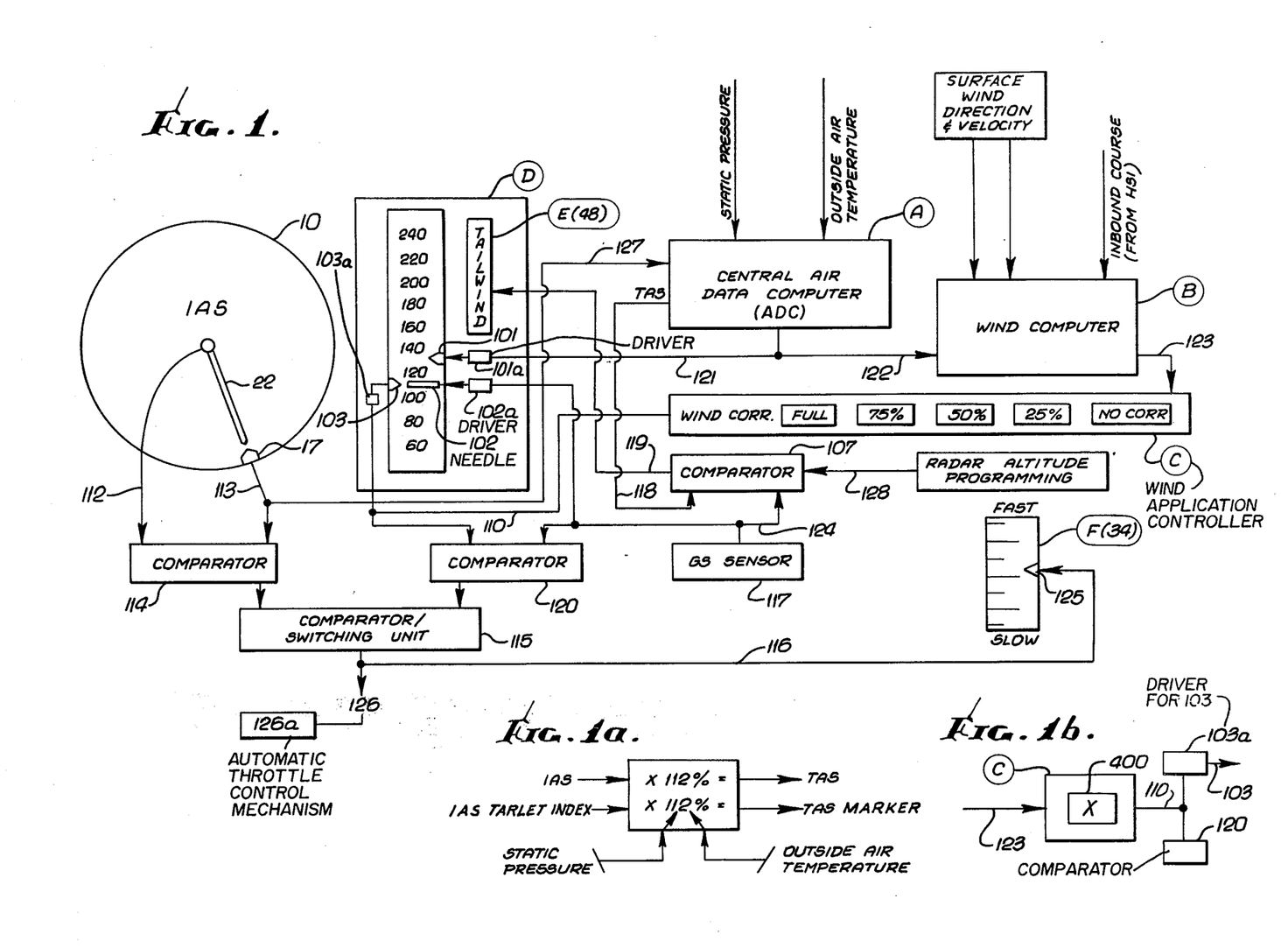
FIG. 1 is a diagramic presentation of the essential components of the inventive system and the relationship of the various basic components.
FIG. 1a is a block diagram of a portion of the central air data computer (or CADC) seen in FIG. 5.
FIG. 1b is a block diagram of a multiplier and drivers.

Presently used approach instrumentation utilizes an airspeed indicator such as is described in FIG. 1, item 10, with the fast/slow needle 125 programmed entirely by IAS 22, and it's index 17. Groundspeed sensor 117 may comprise an INS, or may be part of a Doppler radar device, Doppler radar with a ground based transponder, or associated with a DME station situated in close proximity to and along the final approach track; or, if a ground transmitter, such as an ILS, is updated to transmit on a precise frequency and the receiver in the aircraft tuned to a precise frequency, the Doppler difference can be read out as groundspeed with an associated device to detect the frequency difference. This would most likely require a temperature controlled crystal in the transmitter, one in the receiver, and the associated equipment in the airplane to detect and read out the frequency difference as groundspeed. However, the present approach system and procedures can be utilized regardless of what type of groundspeed detection system is used, as long as it is sufficiently accurate.

The texts of my previous disclosures U.S. Pat. No. 4,021,010 and application Ser. No. 669,273 are written in such a fashion so as to conform, as much as possible, to accepted general practice. Therefore, the phrase "subtract ⅔ the surface headwind component, not to exceed 20 KTS", has been used in an attempt to conform to normally accepted procedure in most airline operations manuals analogous to "half the headwind component plus the full amount of the gust value, not to exceed 20 KTS total added increment". The description of the setting of the groundspeed index value is meant to explain that there are other ways which may be equally acceptable. The following explanation assumes the full application of the wind component in an effort to improve clarity.

With reference to what will follow, I believe the following to be new, unique, novel, and peculiar to my invention:

(a) The utilization of a new speed parameter, "groundspeed", which is employed under some circumstances, while an airplane is on the final approach to a landing.

(b) The use of either groundspeed, or the conventional indicated airspeed on the final approach, in such a manner so to provide the command function to a third instrument, the fast/slow (F/S) instrument.

Advantages of the above method and apparatus include:

1. The pilot is given his wind component and the difference in wind component compared to that existing in the landing area at all times on the approach.

2. The pilot can monitor the value of any wind shear present constantly throughout his entire approach.

3. The invention makes it known to the pilot if an approach in another direction is safer.

4. The pilot is warned of any hazardous condition of wind component all during the final approach.

5. If there is a tail wind value early on the approach, the pilot can tell from indications at the time of warning what direction will be safer for an approach.

6. The invention automatically adds an airspeed sufficient to counteract any sudden decrease in wind component during final approach.

7. The invention enhances the prospect of arriving over the landing area with a safe speed margin.

8. The invention will assure landing without excessive speed and thus avoid landing distance overruns.

9. The invention adds an additional, relative, consistent quantity to the final approach and the windshear problem, which enables the pilot to make consistent, safer and more accurate approaches.

10. The pilot can monitor, and have available during takeoff, an independent and accurate measure of wind component actually existing during take-off.

11. The invention is designed for use as a standard procedure on every approach and take-off, so that the pilot develops high proficiency in its use.

12. The invention eliminates much of the confusion associated with wind shear and thereby frees the pilot to concentrate on other considerations more readily, allowing a more accurate approach, especially during adverse wind shear conditions.

13. The invention allows the pilot to pre-trim the airplane for expected conditions and thereby arrive at the landing area in a safer condition of flight.

14. The invention utilizes a consistent actual speed all during the final approach giving a constant rate of descent on the glide path.

15. The invention includes a tailwind warning device, and gives the pilot information to effectively deal with it.

PREFERRED EMBODIMENT

In the drawings FIGS. 1-8 I have illustrated diagrammatically and graphically the present invention as it is applied with present day aircraft equipment. That is, the known components are those which are currently used and improved; including an airspeed indicator FIG. 1 item 10 with its indicated airspeed (IAS) needle 22, IAS target index 17 and a fast/slow (FS) indicator F. (34). Element (A) can be a conventional Central Air Data Computer (CADC) which ordinarily computes true airspeed (TAS) by applying pressure and temperture corrections to IAS. The CADC is modified so as to apply the same percentage correction to the IAS target index setting to obtain the zero wind marker setting as is applied to IAS to the obtain TAS. As for example, when IAS × 112% is appropriate to obtain the correct TAS, then the IAS target index setting (17) × 112% = the setting of the zero wind marker (101). See FIG. 1a. Element (B) FIG. 1, can be any conventional navigation computer capable of applying wind angle and velocity corrections to the approach TAS or zero wind groundspeed value and inbound course signals to compute an approach groundspeed target value. The DME (distance measuring equipment) and area navigation (RNAV) systems portray known systems frequently used in present aircraft, capable of computing GS in the usual fashion by sensing mileage position change over an appropriate period of time. In fact, each of these known pieces of equipment are often installed and available in fully instrumented aircraft. These are modified as described later as in FIGS. 7a and 7b. Therefore, without showing and without describing the details of these six basic pieces of equipment, it is to be understood that they are in each instance used, in carrying out the present invention, as commercially available equipment with the described modifications. The GS sensor may be an INS or Doppler radar device or other devices modified as described herein, from which adequate GS information may be obtained.

One purpose of this continuation application is to fully disclose and define means of integrating the present invention into existing instrument systems, and disclose some means for obtaining groundspeed usable in the present concept. An additional purpose is to disclose the use of unit C, the wind application controller. The description is intended to disclose a fully automated means to implement the present invention so that the only additional workload on the Pilot is the insertion of the surface wind direction and velocity into the wind computer and even this can be automated with a wind signal from the ground giving surface wind direction and velocity; however, other means for programming either the zero wind marker or the GS target index may be used without deviating from the purposeful concept of this invention. For instance, the zero wind marker 101 can be set to the calculated TAS value of the IAS target index 17 at the air temperature and pressure of the airport of intended landing instead of continuously corrected to the conditions the airplane is flying through as described in the present disclosure. (This procedure will result in a 1-2 knot error at the beginning of the final approach).

Referring now in more detail and by reference to FIG. 1, the inventive system requires that a groundspeed parameter be used under some circumstances while an airplane is on the final approach to a landing. Either groundspeed, or the conventional indicated airspeed on the final approach, is automatically selected and used in such a manner so as to provide the control function to a third instrument, the fast/slow (FS) instrument. Using this system and procedure, the F/S instrument assumes a far greater importance than it has in present systems, and it is always the primary speed reference on the final approach.

The means used to determine which speed parameter, groundspeed or indicated airspeed, controls the F/S instrument will become evident in the following:

During the approach, the F/S needle 125 is commanded by either the groundspeed needle 102 relative to its target index 103, or the indicated airspeed needle 22 relative to its target index 17, whichever speed quantity is lower relative to its associated target index. Thus, if one speed quantity is higher than its associated target index and the other is equal to its associated target index, the F/S needle will read zero. If one is equal to its associated target index and the other is 5 knots lower than its associated target index, the F/S needle will read 5 knots slow. If one is 5 knots higher than its associated target index and the other is 10 knots below its associated target index, the F/S needle will read 10 knots slow.

If an airplane approaches a runway with no wind present all during the approach, the GS and TAS will be equal at all times on the approach. The zero wind marker 101 is programmed by the CADC (item A) to indicate the TAS value of the setting of index 17 through routing or paths 127 and 121. The CADC normally applies a temperature and pressure correction to the IAS or equivalent to produce a TAS value. This same percentage correction can be electrically applied to the IAS target index 17 value to program the zero wind marker 101 to the TAS value of the target index 17 setting via 121. The CADC also sends this zero wind marker signal to the wind computer (item B) through path 122 where a correction is applied, for that component of the surface wind which affects the GS, for the programming of the "target GS index" 103 through the "Application Controller" (item C). For the moment, it is assumed the normal 'FULL' or 100% correction button is selected on C and that the full value of wind component is delivered to program the target GS index 103 through routes 123 and 110, it being assumed that this FULL correction button is automatically the normal selection. The target GS index 103 on the GS indicator is analogous to the target IAS index 17 on the IAS indicator. This "target GS index" 103 and the GS needle 102, at appropriate times, controls the F/S needle 125 through comparator 120 in the same manner as the target IAS index 17 and the IAS needle 22 does through comparator 114 at other appropriate times through comparator/switching unit 115, via route 116. The same signal may be used to control an existing aircraft engine automatic throttle control mechanism 126a via path 126. If no wind is inserted into the computer, the target index 103 will be programmed to the same setting as the zero wind marker 101. An illustrative computer (unit B) is disclosed in U.S. Pat. No. 3,924,111 to Farris.

This equipment and concept is designed for use in a similar fashion for all approaches, and the wind correction used to program the "groundspeed target index" 103 is the surface wind, not including gusts, as given by the air traffic control tower, although the most accurate wind in the landing area, not including gusts, should be used.

The invention, including further features, advantages, and methods of extracting necessary information from indications which are unique to this system, will become clearer in the following description of the system in use.

The IAS target index 17 is set as described (as is normally done presently on existing instrumentation before beginning an approach). If there is no difference in wind all during the approach, the wind will be the same at all times during the approach as at the surface. If the Pilot manipulates the airplane so as to cause the F/S needle to remain on zero, the indicated airspeed will remain equal to its associated target speed index, and the groundspeed will remain equal to its associated target speed index all during the approach.

If there exists a stronger headwind at altitude than on the surface, the groundspeed relative to its associated groundspeed target index will program the F/S needle. Whenever the present headwind is greater than the headwind at the surface, the indicated airspeed will be greater than its associated airspeed target index by an amount equal to the value of excess headwind. The Pilot will have a direct measure on the amount of airspeed he can expect to lose before reaching the runway threshold. The greater the wind shear, the greater the amount of excess indicated airspeed. The great hazard of rapidly decreasing headwind, with the associated rapid loss of airspeed, is eliminated. This case describes a normal wind gradient, and therefore describes the most usual case.

In cases where there exists a lesser headwind early on the approach, the indicated airspeed and its associated target index will program the F/S needle. The Pilot will control the airplane by much the same standard as is used without this system, but with some important advantages. The groundspeed will indicate higher than its target index. The amount of excess groundspeed is a measure of the expected headwind increase the Pilot can expect before reaching the runway threshold, and it is of no concern unless the groundspeed exceeds the zero wind marker value. The zero wind marker value can be considered the same as the true airspeed approach value, and can be considered the same as a no-wind approach groundspeed value. This leads to the next case.

In cases where there exists a tailwind early on the approach, assuming the Pilot has chosen a landing direction with a headwind on the ground, as is normally accepted procedure, the following situation exists:

The IAS 22 will be lower compared to the IAS target index 17 than the GS 102 is compared to its associated GS target index 103, and therefore the IAS 22 and its associated target index 17 will program the speed of the airplane by programming the F/S needle 125. The operation of comparators, 114, 115 and 120 are analogous to the operation of comparators 29, 32 and 28 in my U.S. Pat. No. 4,021,010. Also, sensor 117 correspond to detection system 27 in my patent. If the Pilot controls the F/S needle on "0", the GS 102 will exceed the "0" wind GS marker 101 by the amount of the tailwind value. The GS needle 102 reading is also important in that the required runway stopping distance is totally dependent on the GS 102 value over the end of the runway. If the groundspeed 102 signal through path 124 exceeds the TAS signal through path 118 by a certain amount, the output of comparator 107 activates the tailwind (TW) warning device E (48), warning the Pilot of the potential danger of his high GS 102.

The output of comparator 107 is variable as regards to the actual altitude as indicated by line 128 from a radar altimeter, and the T/W warning programming is variable, as for example: 5 KTS at 100 ft. altitude, 10 KTS at 200 ft. 15 KTS at 300 ft. depending on the chracteristics of the particular type airplane's deceleration capability. In any case, the Pilot can monitor the actual groundspeed value at all times during the approach.

Reference is now made to unit C, the application control. This unit enables a percentage choice of the amount of surface wind component correction applied to the target GS index 103. If the surface wind is set into the wind calculator B, and a later surface wind is given by the Air Traffic Control Tower which amounts to, for example 50% of the original wind component value when there is not enough time for reprogramming the calculator, the Pilot can press the 50% button on the application control unit. This action reduces the amount of surface wind programming affecting the setting of the GS target index 103 by 50% and gives all indications and parameters which would exist had the new surface wind been inserted into the surface wind calculator B. FIG. 1b shows a multiplier 400 in representative unit C to accomplish the appropriate percentage reduction referred to. Also, FIGS. 1 and 1b show appropriate drivers 101a, 102a and 103a for the indexes zero wind marker 101, the groundspeed indicator 102, and target groundspeed index 103.

Whenever reference is given as a Pilot action to control speed, it is assumed to also mean similar means of speed control by an automatic device, such as an automatic throttle.

Figures 2, 3, 4:
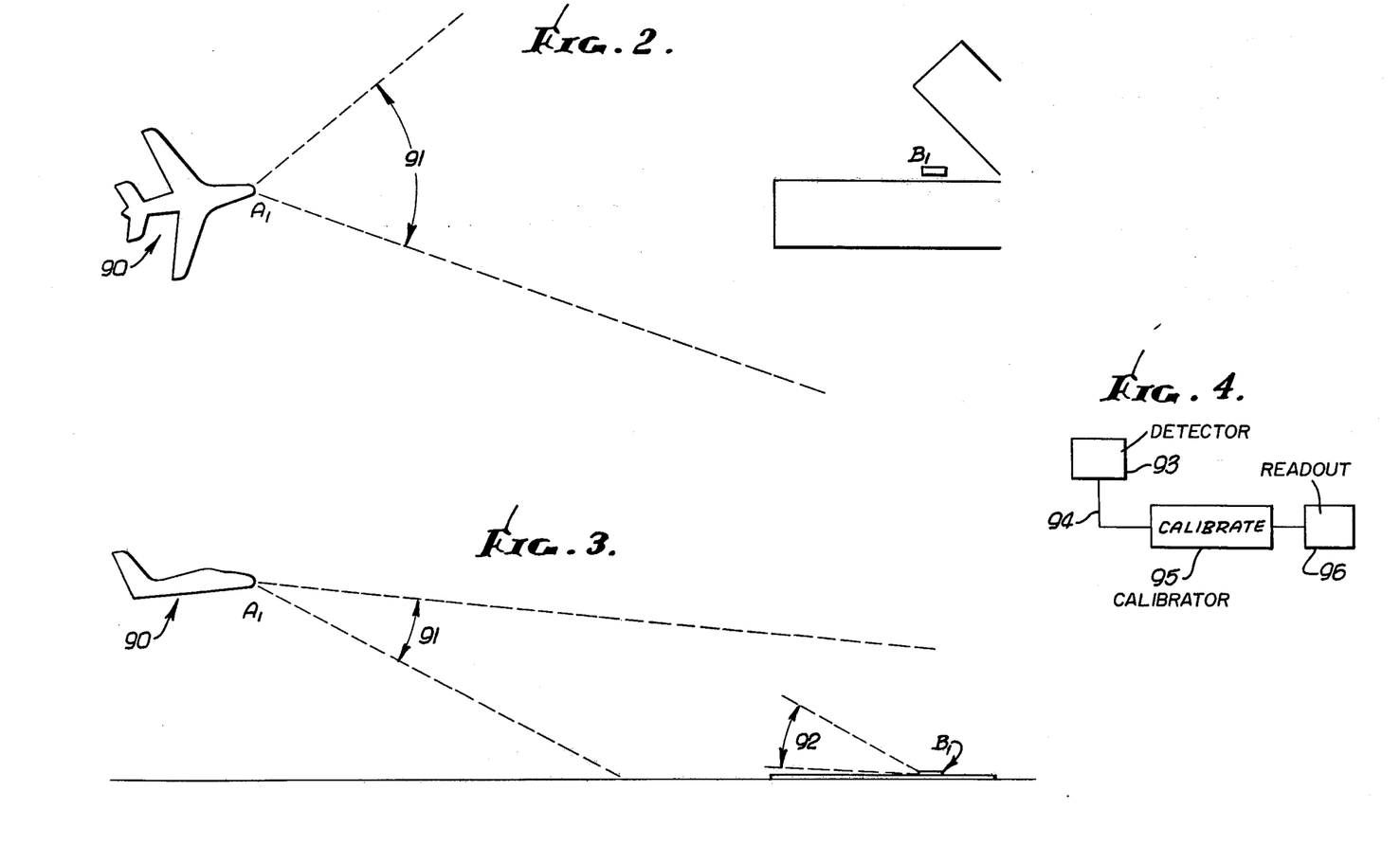
FIG. 2 is a plane view of an aircraft approaching to land with associated groundspeed measuring equipment.
FIG. 3 is a elevation view of the approach depicted in FIG. 2.
FIG. 4 illustrates a block diagram of components

FIGS. 2, 3 and 4 refer to methods for providing groundspeed information for use in systems dedicated to overcoming wind shear problems. The illustrated system uses an airborne Doppler radar system similar to those used to detect traffic speed on highways. Doppler radar unit $A_1$ on approaching aircraft 90 transmits a wide, cone or fan shaped beam 91, at frequency $f_1$, of electromagnetic radiation (for example radio waves) forwardly of the aircraft. The beam is received by unit $B_1$ based at or near the landing strip. The receiver "sees" the frequency $(f_1 + \Delta)$, the term $\Delta$ representing the increase in frequency due to Doppler effect. The unit not only includes a receiver, but also a transmitter including an oscillator, antenna and appropriate circuitry to re-transmit back toward the aircraft a "like" beam 92 of radiation; that is, the re-transmitted beam has the same frequency $(f_1 + \Delta)$ as that it received. The re-transmitted beam may or may not be in phase with the received beam.

The unit $A_1$ on the aircraft receives the re-transmission, which it "sees" as increased frequency $(f_1 + 2\Delta)$, due to Doppler effect. The magnitude of the return frequency, or the increase $2\Delta$, is used to determine actual closure (or ground) speed of the aircraft 90 relative to unit $B_1$. For example, the return frequency may be detected at 93 in FIG. 4, or processed to derive $2\Delta$, and the output 94 may be fed to a calibrator 95 which produces a closure speed signal to readout 96.

Advantage of the FIGS. 2-4 system include the following: unit $A_1$ may be lightweight, relatively low-power device, and can be employed to obtain accurate groundspeed values even though the aircraft heading is somewhat different from its direction of travel, due to drift. Normally, the axis of the cone of beam 91 is generally lengthwise of the aircraft 90. Also, unit $B_1$ can be used to serve multiple aircraft approaching from different directions, if it is placed near the intersection of the runways. Through use of pulsed signals in beam 92, several aircraft can be accommodated on the final approach at the same time, and accurate groundspeed provided to each.

Figures 5, 6, 7A:
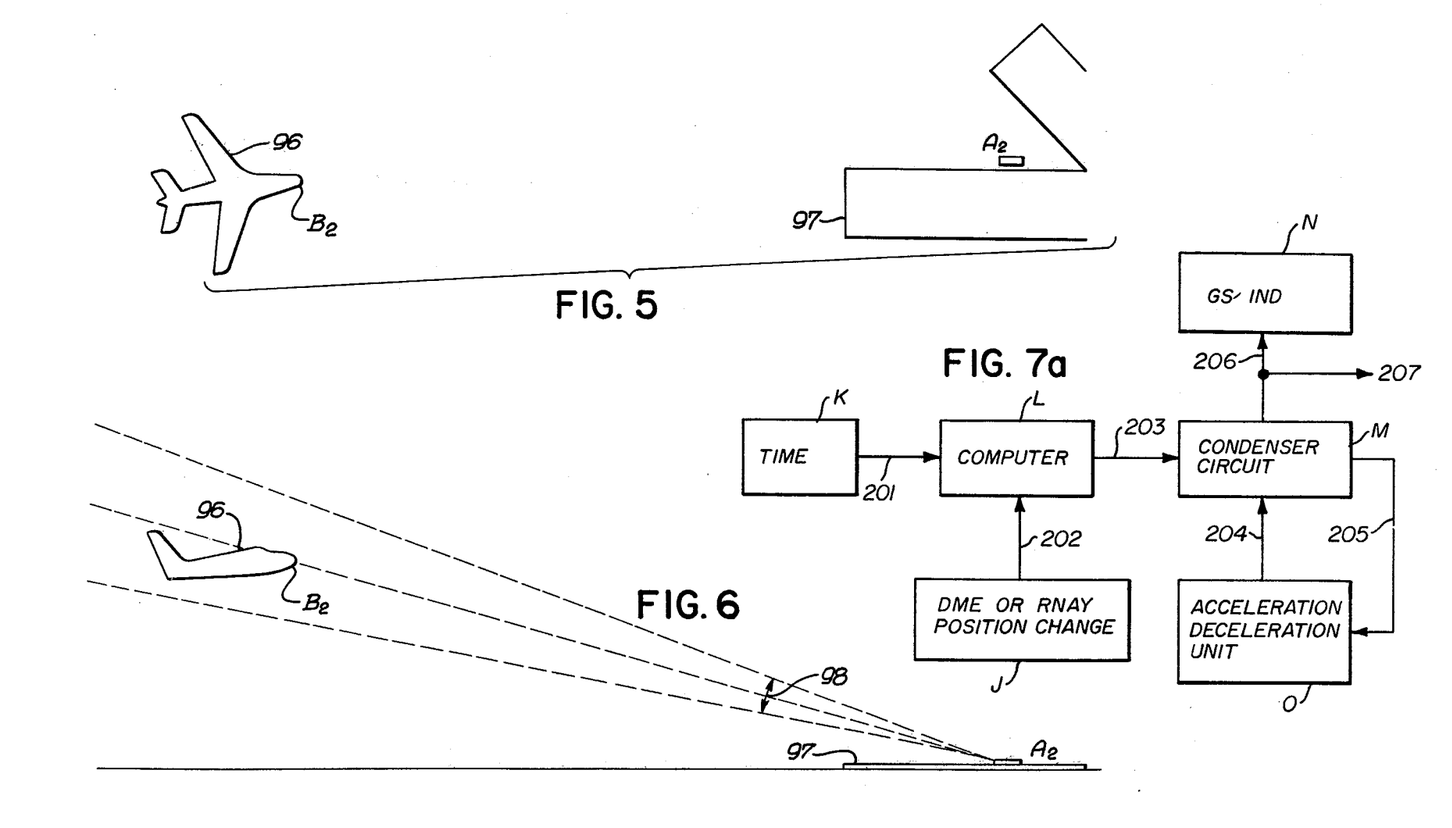
FIG. 5 is a plane view of an aircraft approaching to land, and a second groundspeed measuring device.
FIG. 6 is a elevational view of the FIG. 5 approach and second type measuring system.
FIG. 7a and 7b are block diagrams illustrating how GS from an area navigation device or a DME co-located with an Instrument Landing System (ILS) can be modified for use in the inventive system.

In FIGS. 5 and 6, the in-flight aircraft 96 is shown approaching a runway 97 on which an Instrument Landing Glideslope is installed; however, the transmitter at $A_2$ can be either part of an existing unit, or a special separate unit, installed for the express purpose of providing a groundspeed signal. Transmitter $A_2$ produces an accurately on-frequency signal, of frequency $f_2'$, transmitted as beam 98. The airborne receiver unit at $B_2$ receives the signal as frequency $(f_2 + \Delta)$, $\Delta$ being due to Doppler effect, and compares it with a standard frequency $f_2$ which is the same as that transmitted by $A_2$. The magnitude of the difference $\Delta$ represents the groundspeed, and may be processed and readout as such, on board the aircraft.

Figures 7B, 8:
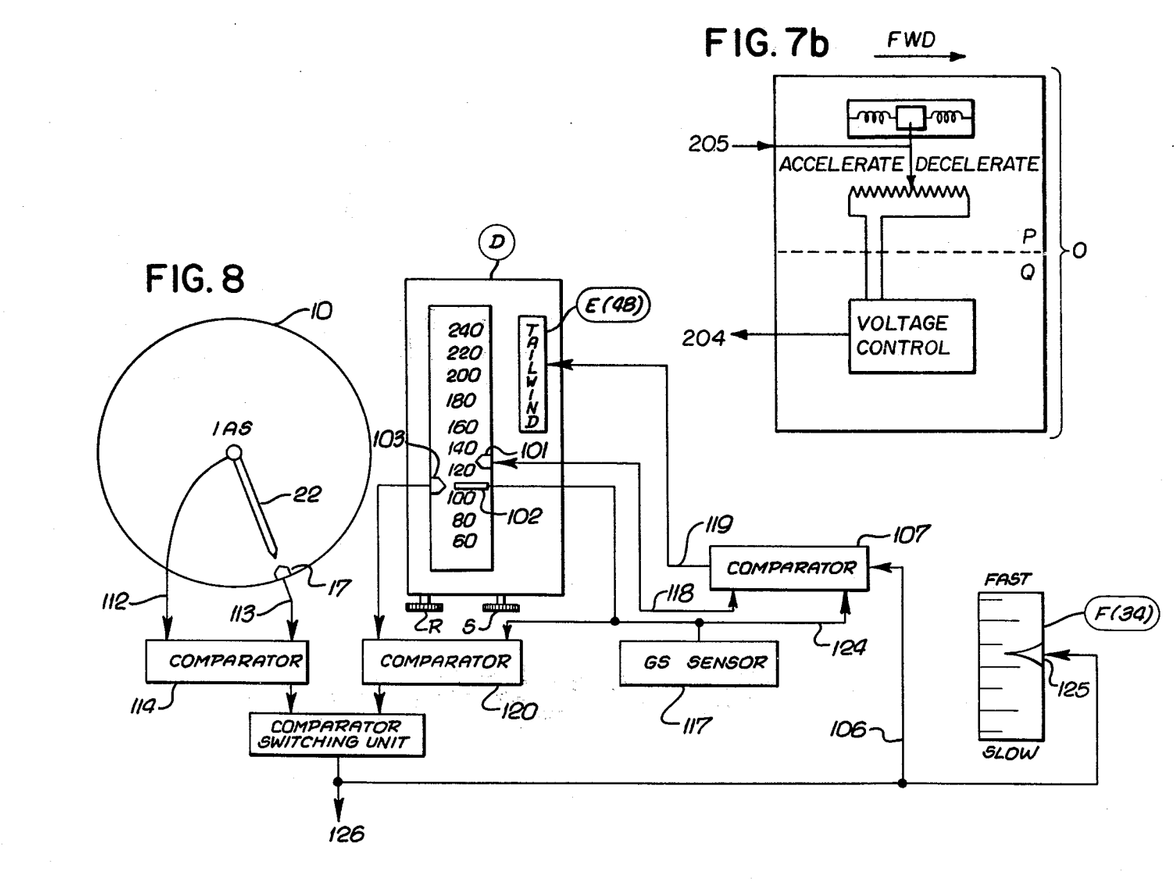
FIG. 8 is a diagram like that of FIG. 1, with manual, or other simple adjustment of the index and zero wind marker.

FIGS. 7a and 7b illustrate a device for improving aircraft groundspeed information as derived from existing navigational devices and its use in improved systems. Basically, the system utilizes inertially derived information to improve the accuracy of groundspeed (GS) information as derived from existing devices, and also concerns new applications of such GS information. The device produces a GS signal of high accuracy and fidelity which may be used in aircraft systems designed for wind shear protection and/or improvement in Area Navigational (RNAV) devices to improve a computerized phantom glideslope for use in an approach to a runway which may not be equipped with a full Instrument Landing System (ILS). Further, this aspect of the invention relates in general to a new and useful improvement in aircraft instrumentation, and in particular to the derivation of GS sufficiently accurate so as to be useful in instrumentation designed for low level wind shear protection on the approach and for improving phantom glideslope accuracy in RNAV systems.

Present DME devices have a lag of 5 to 40 seconds in GS detection accuracy due to a combination of necessary elements including smoothing of the signal of distance measurement, the necessary memory circuits, noise received along with the distance sensing signal, and the delay involved in processing the interrogation and return signals. The GS as derived from such rudimentary distance data over a factor of time is necessarily only an approximation when actual changes in GS occur. Presently used DME and RNAV systems derive GS information of sufficient accuracy for navigational purposes, but not accurately enough for use in systems designed to maintain or utilize a specific GS.

Existing RNAV devices detect GS from the computerized position changes as detected from changes in Omnidirectional Radio (OMNI) bearings and/or DME distance changes. These computer calculated position changes are generally subject to an even more broad approximation in position than that obtained from DME alone. Since both systems are capable of resolving a steady state GS measurement, a similar updating system may be used in either case to increase the fidelity of GS measurement when changes in actual GS occur.

It is a general object of this aspect of invention to provide an instantaneously correct measurement of GS and a signal accurately depicting GS with good fidelity for use in other systems. Another object is to utilize presently available and commonly used devices to provide this GS, with little expense, for aircraft which would not normally require an expensive INS. A further object is to provide an improved GS signal, not available without INS, for use in a wind shear protection system in particular, and in other systems where an accurate GS signal may be desirable to improve the accuracy of a system, for instance: when an RNAV is used as a localizer for an approach using phantom waypoints in line with a runway, an accurate GS can be used through a computer to establish an accurate phantom glideslope between these phantom waypoints.

In FIGS. 7a and 7b I have illustrated by block diagrams the device as it is applied with present day aircraft equipment. That is, the known components are those which are currently used and improved, including the Distance Measuring Equipment (DME) or Area Navigation Device (RNAV)-J, a timing device K, and groundspeed (GS) computer L. The accelerometer P in unit O and associated existing gyro positioning or compensating devices are also known and assumed to be commercially available pieced of equipment. Therefore, without showing and describing these five basic pieces of equipment in detail, it is to be understood that they are in each instance used, in carrying out the invention employing commercially available elements of equipment. It is understood that they are often installed and used in a fully instrumented aircraft, although for the present invention, the previously mentioned smoothing and conventional memory characteristics of the output of the computer L is removed from signal 203, as these functions are performed in the condenser circuit M.

Referring now in more detail to FIG. 7a, J represents a normally used radio activated navigational device such as a DME or RNAV system from which is produced a raw signal, not smoothed nor influenced by a memory circuit. Unit K is a timer which produces an electrical impulse fed via path 201 to the computer L. Computer L samples the amount of position change from unit J over a factor of the time impulses from unit K, and produces a GS signal 203 to condenser circuit M, an example being an electrical signal of varying voltage, such that the higher the GS sensed, the higher the voltage charge to the condenser M. This pulsed voltage charges condenser M in such a manner so that the voltage charge in condenser M is at all times effectively equal to the peak voltage of the pulses. The voltage charge of condenser M is monitored through path 206 by unit N, which contains a voltage following circuit calibrated to read out the appropriate voltage as GS. The condenser unit M feeds this same voltage as a base voltage via path 205 to the acceleration detection unit O which is utilized in such a manner so as to provide an additional voltage control for the condenser charge. A more detailed description of unit O is presented in FIG. 7b, where section P consists of either a gyro stabilized accelerometer, or as is more generally utilized, a body mounted gyro compensated accelerometer. In either case, the accelerometer must measure the horizontal acceleration along the longitudinal axis of the aircraft to program the voltage control Q such that a deceleration sensed at, as for example, 1 Knot per second lowers the condenser voltage charge so as to cause the voltage following circuit N to indicate 1 Knot per second less GS. Conversely, when the accelerometer detects an acceleration the charge of condenser M is increased a commensurate amount to cause an increase in GS readout equal to the amount of acceleration. Whenever a change in GS takes place, the accelerometer detects the change, and the signal from the computer L then corrects or confirms the new speed as necessary, via path 203 from the GS computer.

There is a source of GS signal at 207 which, for example, may be fed back to the RNAV device so that a more accurate position may be used to program a phanton glideslope.

FIG. 8 represents an embodiment of the present invention in its more simple form. The principle part of the system is, of course, the groundspeed (GS) indicator D, with its GS indicating needle 102 and target index marker 103, set by thumbscrew adjuster R, and zero wind marker 101, set by thumbscrew S. This system is used in a manner similar to that in FIG. 1 except in this instance it is utilized in an aircraft which is not equipped with a Central Air Data Computer nor a Radio Altimeter.

The Pilot sets the indicated airspeed target index 17, as is normal, to his planned approach IAS. He then calculates when the true airspeed (TAS) will be over the runway threshold at this IAS using the airport pressure altitude and temperature and sets zero wind marker 101 to this value. The zero wind marker 101 setting can then be termed the planned approach TAS or planned zero wind GS marker. He then calculates the surface headwind component, subtracts this value from the zero wind marker 101 setting, which forms the value for setting index 103, the target GS index. Since there is no Central Air Data Computer to compute TAS, the tailwind warning (T/W) is programmed in the following manner;

Basically, the comparator 107 is set to activate the T/W device E 48 whenever the actual GS 102 exceeds the zero wind GS index or marker 101 by a pre-programmed amount, such as 5Kts. Under this circumstance the IAS 22 and its associated target index 17 will program the F/S needle 125. If the Pilot has allowed the airspeed to become 10Kts. faster than planned, the IAS 22 will be 10Kts. higher than its associated target index 17, and the F/S indicator 125 will indicate 10Kts. fast. Comparator 107 is then variably programmed via route 106 so as not to activate the T/W warning E 48 unless GS 102 exceeds the zero wind marker 101 by 15Kts. or more. Effectively, the input 106 programs comparator 107 such that when the F/S needle 125 is at −15 the T/W warning is activated when the GS needle 102 is above the value of marker 101 minus 10 Kts, and when the F/S needle 125 is on zero the T/W warning E 48 is activated whenever the GS 102 exceeds marker, and 101 by more than 5 Kts.

I claim:

1. In the method of controlling the power to be applied to an aircraft engine during a final approach, whether wind shear conditions exist or not, and including the steps:
    (a) monitoring deviation of actual airspeed from a target airspeed on the approach, and deviation of actual groundspeed from a target approach groundspeed on the approach, and
    (b) employing such deviations in such a manner so that the approach speed is controlled by whichever of the actual speeds is lower compared to its associated target speed, and using said lower actual speed to control power to maintain a stabilized aircraft speed condition during the final approach, the improvement comprising:
    (c) utilizing air temperature and pressure data to modify the value of target indicated airspeed thereby to derive a true airspeed value for use as a zero wind groundspeed marker value,
    (d) displaying said value, and
    (e) modifying said value as a function of an automatically or manually programmed surface wind velocity along course component to derive an uncompensated value of said target approach groundspeed, and
    (f) in the case of a manually programmed surface wind velocity value, correcting said uncompensated value by selecting one of a group of possible percentages of wind component to derive a compensated target approach groundspeed.

2. The method of claim 1 wherein said displaying of zero wind marker value includes providing a groundspeed scale and a zero wind marker associated with said scale to indicate on said scale, and including the further step of providing a GS marker associated with said scale to indicate said actual groundspeed on said scale.

3. The method of claim 2 including the further step of providing a GS target index, compensated or uncompensated, associated with said scale to indicate said target approach groundspeed on said scale.

4. The method of claim 3 including the step of adjusting the position of said GS target index as a function of the surface wind direction and velocity relative to the inbound course of an aircraft.

5. The method of claim 1 that includes providing an aircraft FAST/SLOW display, and driving said display as a function of said lower actual speed compared to its associated target speed.

6. In the method of controlling the power to be applied to an aircraft engine during a final approach, whether wind shear conditions exist or not, and including the steps:
 (a) monitoring deviation of actual airspeed from a target airspeed on the approach, and deviation of actual groundspeed from a target approach groundspeed on the approach, and
 (b) employing such deviations in such manner so that the approach speed is controlled by whichever of the actual speeds is lower compared to its associated target speed, and using said lower actual speed to control power to maintain a stabilized aircraft speed condition during the final approach,
 the improvement comprising:
 (c) utilizing air temperature and pressure data to modify the value of target airspeed thereby to derive a true airspeed or zero wind marker value,
 (d) displaying said value, and
 (e) said displaying including providing a ground speed scale and a zero wind marker associated with said scale to indicate on said scale,
 (f) providing a GS target index associated with said scale to indicate said target approach groundspeed on said scale,
 (g) and providing wind velocity component correction selectors, and adjusting the position of the GS target index as a function of selecting a correction selector that corresponds to a chosen percentage wind velocity component correction to be made subsequent to earlier positioning of the GS target index.

7. In the method of controlling the power to be applied to an aircraft engine during a final approach, whether wind shear conditions exist or not, and including the steps:
 (a) monitoring deviation of actual airspeed from a target airspeed on the approach, and deviation of actual groundspeed from a target approach groundspeed on the approach, and
 (b) employing such deviations in such a manner so that the approach speed is controlled by whichever of the actual speeds is lower compared to its associated target speed, and using said lower actual speed to control power to maintain a stabilized aircraft speed condition during the final approach,
 the improvement comprising
 (c) providing a ground speed scale, a GS marker associated with said scale to indicate said actual groundspeed on the scale, and a GS target index associated with said scale to indicate said target approach groundspeed on said scale, and
 (d) providing wind velocity component correction selectors, and adjusting the position of the GS index target as a function of choosing a correction selector that corresponds to a chosen percentage wind velocity component correction to be made subsequent to earlier positioning of the GS target index.

8. In apparatus useful in determining power to be applied to an aircraft engine during the final approach to a landing, the combination comprising
 (a) first means for monitoring deviations of actual aircraft airspeed from a target approach indicated airspeed, and deviations of actual aircraft groundspeed from a target approach groundspeed,
 (b) second means coupled to said first means for providing an indication from which engine power application may be controlled, and
 (c) computer means responsive to said target approach indicated airspeed value and to air temperature and pressure conditions to compute a value of true airspeed, or zero wind groundspeed, and responsive to said value and to a surface wind component to derive said approach target groundspeed, there being means providing a group of selectors corresponding to different percentages of wind component and adapted to be selected to modify said approach target groundspeed.

9. The combination of claim 8 including a means to display said approach true airspeed or zero wind groundspeed value on a groundspeed instrument.

10. The combination of claim 9 wherein said last name display means include a speed scale, a zero wind marker associated with said scale to display said zero wind value and there being a GS marker associated with said scale to display said actual aircraft groundspeed.

11. The combination of claim 10 including a target index marker associated with said scale to display said target approach groundspeed.

12. The combination of claim 11 wherein said computer means includes a wind computer means responsive to said zero wind groundspeed values, and also responsive to wind direction and velocity values at the landing surface location, either automatically or manually, thereby to provide correction values for adjusting the position of said GS target index relative to said scale.

13. The combination of claim 12 including means responsive to selection of a percentage correction of surface wind component applied when manually programmed, to effect readjustment of the position of the GS target index in correspondence to said percentage correction.

14. The combination of claim 8 including a FAST/SLOW indicator, and means to drive said indicator as a function of whichever of the actual airspeed and the actual groundspeed is lower compared to its associated target index.

15. The combination of claim 8 including a tailwind warning device, and a comparator responsive to a true airspeed value and to an actual groundspeed value to actuate said device when the groundspeed value exceeds said true airspeed value by an amount variable in accordance with actual aircraft altitude.

16. Apparatus as defined in claim 8 including means to provide actual approach groundspeed as described including INS, Doppler radar, or a device providing a Doppler fan shaped beam projected ahead of an aircraft, and utilizing a ground based transponderlike device to eliminate errors of groundspeed detection due to drift of the aircraft or heading different from direction of travel.

17. Apparatus as defined in claim 8 including means to provide inertially updated Doppler detection of groundspeed derived from ground based and airborne equipment, said means used for the purpose of actual groundspeed detection in the described system.

18. Apparatus as defined in claim 8 including cooperating instrumentation on an aircraft and on the ground near the landing area to produce on the aircraft a Doppler frequency shifted signal indicative of actual groundspeed of the aircraft.

19. The combination of claim 8 wherein
   (d) said means defined in a) includes a device to provide an actual groundspeed GS signal of high accuracy, said device including a GS signal conditioning circuit incorporating an accelerometer whose output signal proportionally corrects the GS signal value.

20. The combination of claim 19 wherein said device includes:
   (d) a condenser circuit whose output signal is a measure of GS,
   (e) circuitry to intermittently charge the condenser circuit in accordance with samples of sensed GS,
   (f) and wherein the accelerometer output signal is also connected to variably increase or decrease the charge of the condenser circuit, the accelerometer being oriented to sense acceleration or deceleration along the flight path of an aircraft and thereby to effect said increase or decrease, respectively of said condenser circuit charge.

21. In the method of controlling an aircraft's speed on the final approach to a landing by controlling the power to be applied by its engines, and with the use of a groundspeed value equal to that which will obtain when approach the runway threshold on that particular approach with the conditions existing in the landing area regarding altitude, temperature, and wind conditions, the improvement consisting of the method including:
   (a) converting a normal approach Indicated Airspeed (IAS) target value to a related True Airspeed (TAS) value and using said related TAS value as a zero wind reference or marker value on a groundspeed indicator, said conversion including modifying a Central Air Data Computer (CADC) or using data from said CADC to perform such conversion,
   (b) employing computer means to resolve an along course wind component using said related TAS value, said employment including applying surface wind direction and velocity and inbound course information, and
   (c) if the surface wind information is not automatically continuously programmed, modifying said surface wind application with a percentage application in such manner that a percentage of wind application may be selected from a group of possible percentage values late during the final approach when insufficient time remains to reset a new surface wind direction and velocity into the computer as may be more recently reported by a control tower, and
   (d) applying said surface wind along course component value to said zero wind marker or related TAS value to establish a GS target index value of expected GS when approaching the runway threshold, and displaying same on a groundspeed indicator as an additional speed criteria for use all during the final approach, and
   (e) using said GS indicator, with said zero wind marker or reference along with said GS target value relative to the display of actual GS, such GS target value used to establish an additional speed criteria for use all during the final approach so that the aircraft speed may at all times be maintained equal to or in excess of one of the following parameters: GS equal to or in excess of the GS target value or IAS equal to or in excess of the IAS target value.

22. The method of claim 21, including employing said GS relative to said GS target value and IAS relative to said IAS target value to control aircraft speed according to said speed criteria, including the programming and use of another instrument to maintain such speed criteria, including a FAST/SLOW (F/S) instrument for use within the normal approach instrumentation, programmed to maintain the approach speed in accordance with these criteria, and including a signal for programming an automatic throttle device.

23. The method of claim 22 including employing variable means to program a tailwind warning device according to a radar altitude signal, to give a warning of excessive tailwind when the actual GS exceeds the instantaneous TAS by a variably programmed amount according to present altitude.

24. The combined method of claim 22 including employing said groundspeed indicator, with said groundspeed indication relative to said zero wind marker and said target GS index, presented in close proximity to or combined with the IAS instrument, with its IAS indication relative to an IAS target index.

25. The combined method of claim 22 including: employing said F/S instrument programmed to said speed criteria within an approach instrumentation or flight director instrumentation used as the primary speed control device on the final approach.

26. The combined method of claim 23 including: displaying said Tailwind (T/W) warning in close proximity to the groundspeed indicator to call attention to an existing excessive GS relative to the present TAS, the T/W value of which can be quantitatively deduced by the Pilot by observing the amount the actual GS exceeds the zero wind marker on the GS instrument.

27. In combination: the method of claim 21 wherein, when the surface wind direction and velocity is programmed into said computer means, a proper predicted groundspeed approaching the runway threshold on that particular approach is automatically derived and used as an additional minimum speed parameter all during the final approach, including a T/W warning for the only speed condition which may be hazardous, the total quantitative value of which can be determined by indications in the combined system.

28. In apparatus useful in controlling an aircraft's airspeed on the final approach to a landing by controlling the power to be applied by it's engine, such speed value designed to be safe regarding possible windshear conditions, the improvement including:
   (a) first computer means responsive to an airspeed target value and to aircraft altitude and air temperature conditions to compute a true airspeed value of said airspeed target value to program a zero wind marker value for display on a groundspeed indicator scale, (b) second computer means responsive to said zero wind marker value and to an along-course surface wind component value to derive a groundspeed target index value for display on said groundspeed indicator scale, (c) third means responsive to said airspeed compared to said airspeed target value, and responsive to GS compared to said groundspeed target index value for providing a speed criteria from which engine power may be controlled to maintain the lower of the two speed values defined as airspeed relative to said airspeed target index, or groundspeed relative to said groundspeed target index, and (d) fourth means coupled to said third means for providing an indication from which engine power application may be controlled, including a fast/slow indicator, and including a signal means from which an automatic throttle device may be programmed.

29. The combination of claim 28 including a wind component application controller connected to said second computer means, and which includes a selectable percentage means for selecting one of a group of possible percentage values of said wind component to be applied to said groundspeed target index value.

30. The combination of claim 28 including apparatus to display said groundspeed, zero wind marker, and groundspeed target index values in close proximity to an indicated airspeed instrument with its airspeed target index.

31. The apparatus of claim 28 wherein said second computer means has inputs for surface wind direction and velocity, inbound course from HSI, and related approach TAS from the zero wind marker, in order to resolve the along course wind component of the surface wind for programming the groundspeed target index.

32. The apparatus of claim 28 wherein said fast/slow indicator is used as the primary speed control criteria on the approach, including the programming of an automatic throttle device, and including means to drive said indicator as a function of whichever of said speed values is the lower.

33. The apparatus of claim 28 including a comparator responsive to the actual true airspeed value and to the actual groundspeed value to give a warning when the actual groundspeed value exceeds the actual true airspeed value by a selectable amount, this selectable amount variable programmed as respects radar altimeter altitude.

* * * * *